United States Patent
Kim et al.

(10) Patent No.: US 12,478,910 B2
(45) Date of Patent: Nov. 25, 2025

(54) APPARATUS FOR COLLECTING POWDER IN EXHAUST GAS HAVING A FILTER DEDUSTING FUNCTION AND EXHAUST GAS TREATMENT EQUIPMENT PROVIDED WITH SAME

(71) Applicant: CSK INC., Yongin-si (KR)

(72) Inventors: Jinhong Kim, Yongin-si (KR); Myeonghoon Kang, Yongin-si (KR)

(73) Assignee: CSK Inc., Yongin-si (KR)

( * ) Notice: Subject to any disclaimer, the term of this patent is extended or adjusted under 35 U.S.C. 154(b) by 510 days.

(21) Appl. No.: 18/246,262

(22) PCT Filed: Sep. 21, 2021

(86) PCT No.: PCT/IB2021/058595
§ 371 (c)(1),
(2) Date: Mar. 22, 2023

(87) PCT Pub. No.: WO2022/064361
PCT Pub. Date: Mar. 31, 2022

(65) Prior Publication Data
US 2023/0356129 A1    Nov. 9, 2023

(30) Foreign Application Priority Data
Sep. 24, 2020  (KR) .................. 10-2020-0123451

(51) Int. Cl.
*B01D 46/00* (2022.01)
*B01D 46/24* (2006.01)

(52) U.S. Cl.
CPC ..... *B01D 46/0036* (2013.01); *B01D 46/0005* (2013.01); *B01D 46/24* (2013.01)

(58) Field of Classification Search
None
See application file for complete search history.

(56) References Cited

U.S. PATENT DOCUMENTS

| 4,557,738 A | 12/1985 | Menasian |
| 4,565,555 A | 1/1986 | Menasian |

(Continued)

FOREIGN PATENT DOCUMENTS

| CN | 102421509 A | 4/2012 |
| CN | 103752107 A | 4/2014 |

(Continued)

OTHER PUBLICATIONS

European Communication dated Sep. 18, 2024, Supplementary Search Report dated Sep. 6, 2024, Communication dated Jul. 17, 2024 and Supplementary Partial Search Report dated Jul. 8, 2024 for corresponding European application Serial No. EP21871779, 21 pages.

(Continued)

*Primary Examiner* — Brit E. Anbacht
(74) *Attorney, Agent, or Firm* — Theodore M. Magee; Westman, Champlin & Koehler, P.A.

(57) ABSTRACT

Provided in the present invention is an apparatus for collecting powder in exhaust gas comprising: a device for collecting powder contained in exhaust gas before the exhaust gas is introduced into a cylindrical adsorption reaction device that treats the exhaust gas using an adsorption reaction, wherein a cylindrical filter body includes a filter member that filters the exhaust gas and is disposed underneath the adsorption reaction device so as to be connected to the adsorption reaction device; a housing that provides an internal space to house the filter body, and a filter striking module that applies a physical impact to the filter body to dislodge powder adhering to the filter member.

7 Claims, 7 Drawing Sheets

(56) References Cited

U.S. PATENT DOCUMENTS

| | | | | |
|---|---|---|---|---|
| 4,645,520 | A | * | 2/1987 | Huttlin .................... B01D 46/71 55/508 |
| 5,045,098 | A | | 9/1991 | Poor |
| 5,342,433 | A | | 8/1994 | Avondoglio |
| 2016/0129384 | A1 | * | 5/2016 | Schulz .................... B01D 46/60 55/482 |

FOREIGN PATENT DOCUMENTS

| | | | |
|---|---|---|---|
| CN | 208320274 | U | 1/2019 |
| CN | 110420511 | A | 11/2019 |
| DE | 202010009971 | U1 | 10/2010 |
| JP | 2005313041 | A | 11/2005 |
| JP | 2007125294 | A | 5/2007 |
| JP | 2011163273 | A | 8/2011 |
| JP | 2018051472 | A | 9/2016 |
| JP | 2017186974 | A | 10/2017 |
| JP | 2019058841 | A | 4/2019 |
| KR | 20030063786 | A | 7/2003 |
| KR | 20090080228 | A | 7/2009 |
| KR | 20110060385 | A | 6/2011 |
| KR | 20140136814 | A | 12/2014 |
| KR | 101661314 | B1 | 9/2016 |
| KR | 101806170 | B1 | 12/2017 |
| KR | 20190003139 | U | 12/2019 |
| KR | 102190214 | B1 | 12/2020 |
| KR | 102208983 | B1 | 1/2021 |
| TW | 1226259 | B | 1/2005 |
| TW | M36775 | | 11/2009 |
| WO | 2020144595 | A1 | 7/2020 |
| WO | 2022064360 | A1 | 3/2022 |

OTHER PUBLICATIONS

Taiwanese Search Report dated Jan. 19, 2025 and Office Action dated Feb. 4, 2025 for corresponding Taiwanese application Serial No. 110135515, 8 pages.

Taiwanese Search Report dated Jan. 18, 2025 and Office Action dated Mar. 10, 2025 for corresponding Taiwanese application Serial No. 110135615, 8 pages.

PCT International Search Report dated Dec. 20, 2021 for corresponding PCT application Serial No. PCT/IB2021/058595, 4 pages.

PCT International Written Opinion dated Dec. 20, 2021 for corresponding PCT application Serial No. PCT/IB2021/058595, 5 pages.

British Search Report dated Oct. 26, 2021 for corresponding British application Serial No. GB20105811.0, 1 page.

British Search Report dated May 11, 2022 for corresponding British application Serial No. GB2105811.0, 1 page.

Korean Written Decision on Registration dated Jan. 21, 2021 for corresponding Korean application Serial No. 10-2020-0123451, 4 pages.

British Search Report dated Oct. 25, 2021 for corresponding British application Serial No. GB2105810.2, 1 page.

PCT Notification of Transmittal of the International Search Report and the Written Opinion of the International Searching Authority, or the Declaration, PCT Search Report and PCT Written Opinion dated Dec. 21, 2021 for corresponding PCT application Serial No. PCT/IB2021/058593, 11 pages.

* cited by examiner

APPARATUS FOR COLLECTING POWDER IN EXHAUST GAS HAVING A FILTER DEDUSTING FUNCTION AND EXHAUST GAS TREATMENT EQUIPMENT PROVIDED WITH SAME

CROSS-REFERENCE OF RELATED APPLICATION

This application is a Section 371 National Stage Application of International Application No. PCT/IB2021/058595, filed Sep. 21, 2021, and published as WO 2022/064361 A1 on Mar. 31, 2022, the content of which is hereby incorporated by reference in its entirety and which claims priority of Korean Application No. 10-2020-0123451, filed Sep. 24, 2020.

FIELD

The present invention relates to technology for treating exhaust gas in the semiconductor manufacturing process, and more particularly to an apparatus for collecting powder contained in exhaust gas.

BACKGROUND

Semiconductor devices are manufactured by repeatedly performing processes such as photolithography, etching, diffusion, and metal deposition on a wafer in a process chamber. Various process gases are used during the semiconductor manufacturing process, and residual gas exists in the process chamber after the process is completed. Since the residual gas in the process chamber contains toxic components, it is discharged by a vacuum pump and purified by an exhaust gas treatment device such as a scrubber. Powder is present in the exhaust gas, but the powder in the exhaust gas is either a by-product generated in the process chamber, or is formed when some components contained in the exhaust gas are solidified due to changes in temperature and pressure in the process whereby residual gases from the process chamber are discharged through the exhaust line. Since the powder in the exhaust gas can accumulate in the exhaust line and clog up the flow path, it is collected through a powder collection apparatus that is installed on the exhaust line.

The apparatus for collecting powder usually collects powder using a filter, but the powder adheres to the surface of the filter over time, which causes an increase in differential pressure. Therefore, the dedusting task must be performed regularly to remove powder adhering to the surface of the filter. Traditionally, a common dedusting method involves spraying high-pressure gas in a direction reverse to the flow of gas to remove powder attached to the surface of the filter, but this dedusting method either stops or significantly reduces the flow of fluid inside the filter after the high-pressure gas is sprayed. Hence, it has an adverse effect on the overall flow of the exhaust gas treatment process.

The discussion above is merely provided for general background information and is not intended to be used as an aid in determining the scope of the claimed subject matter. The claimed subject matter is not limited to implementations that solve any or all disadvantages noted in the background.

SUMMARY

The object of the present invention is to provide an apparatus for collecting powder in exhaust gas having an economical and stable filter dedusting function and an exhaust gas treatment equipment provided with same.

In order to achieve the object of the present invention, provided in the present invention is an apparatus for collecting powder in exhaust gas comprising: a device for collecting powder contained in exhaust gas before the exhaust gas is introduced into a cylindrical adsorption reaction device that treats the exhaust gas using an adsorption reaction, wherein a cylindrical filter body is provided with a filter member that filters the exhaust gas and is disposed underneath the adsorption reaction device so as to be connected with the adsorption reaction device; a housing that provides an internal space to house the filter body, and a filter striking module that applies a physical impact to the filter body to dislodge powder adhering to the filter member.

The aforementioned objects of the present invention can all be achieved by means of the present invention. Specifically, filter pressure can be effectively reduced by directly striking the filter using a link structure to remove powder adhering to the filter.

Moreover, by using a link structure with a relatively simple structure as the filter striking structure, this method is economical with a lower chance of malfunction.

Damage to the filter can also be minimised by striking the filter from underneath.

The Summary is provided to introduce a selection of concepts in a simplified form that are further described in the Detailed Description. This summary is not intended to identify key features or essential features of the claimed subject matter, nor is it intended to be used as an aid in determining the scope of the claimed subject matter.

DETAILED DESCRIPTION

Hereinafter, the configuration and operation of an embodiment of the present invention will be described in detail with reference to the drawings.

Figure 1:
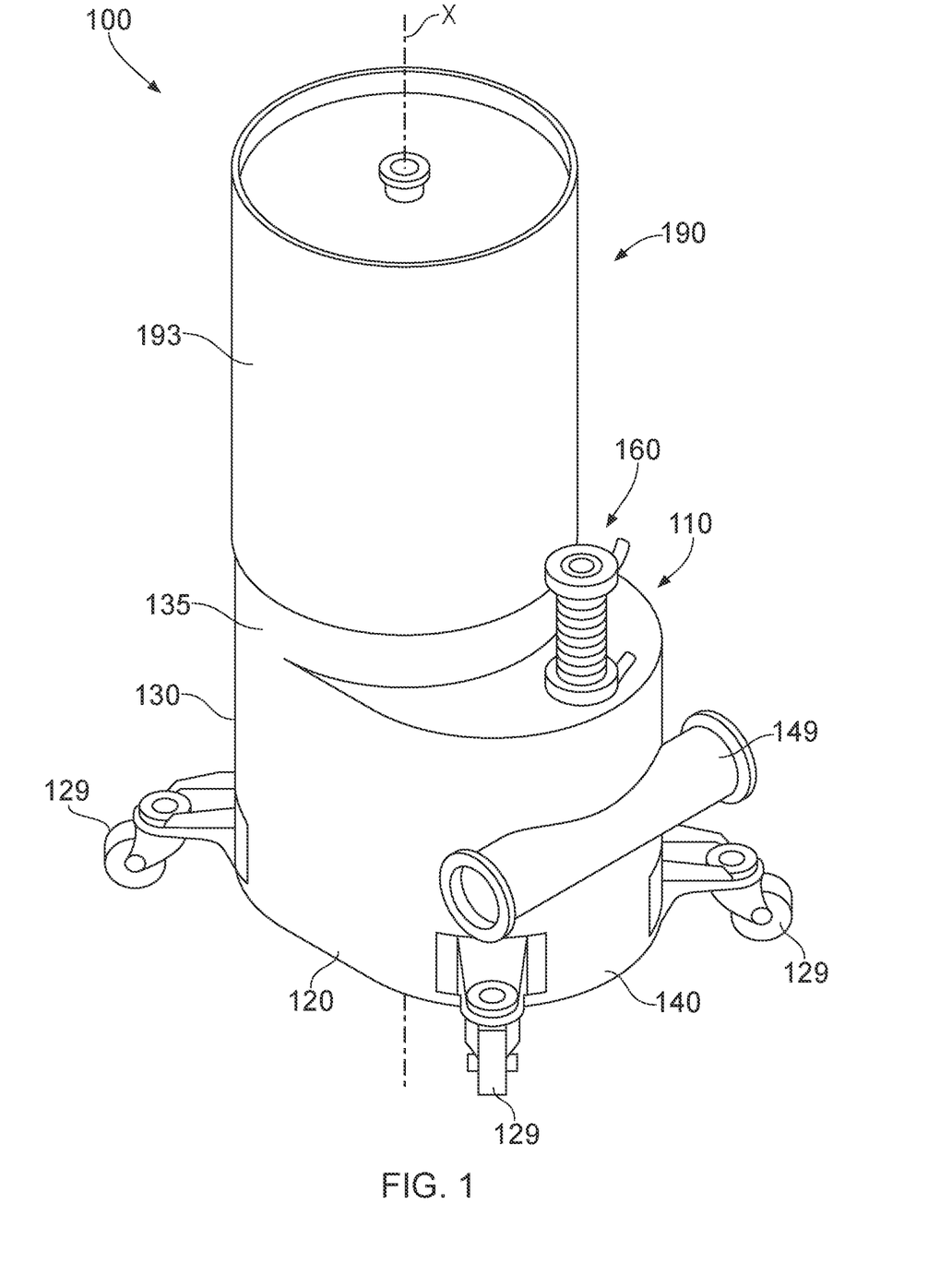
FIG. 1 shows a perspective view of the exhaust gas treatment apparatus provided with an apparatus for collecting powder according to the first embodiment of the present invention.
Figure 2:
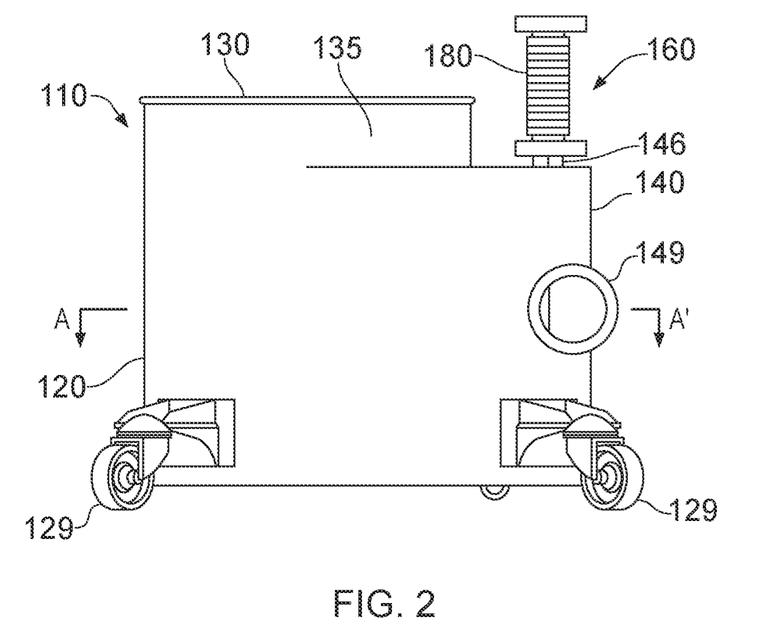
FIG. 2 shows a lateral view of the apparatus for collecting powder depicted in FIG. 1.
Figure 3:
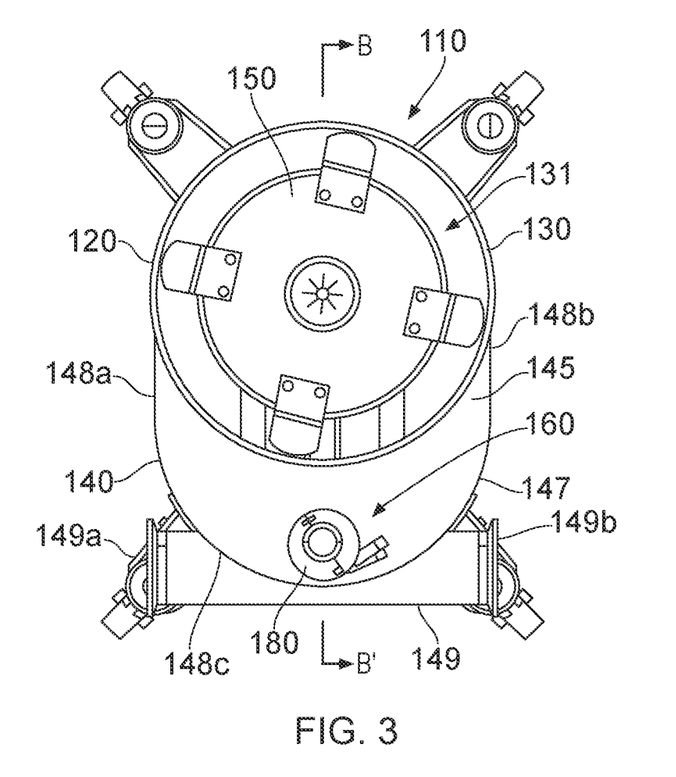
FIG. 3 shows a plan view of the apparatus for collecting powder depicted in FIG. 1.
Figure 4:
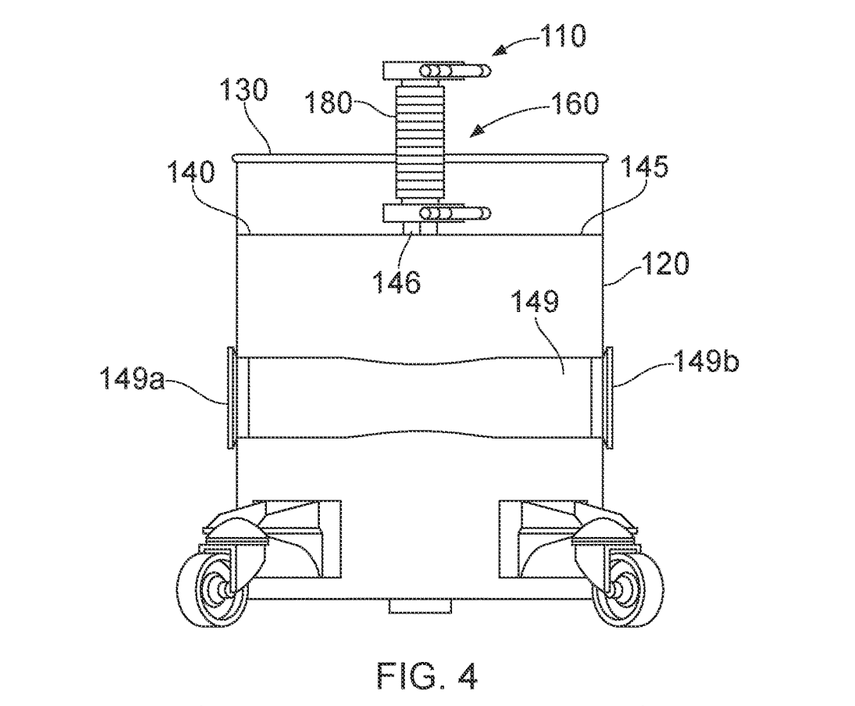
FIG. 4 shows a front view of the apparatus for collecting powder depicted in FIG. 1.

FIG. 1 shows a perspective view depicting an exhaust gas treatment apparatus according to an embodiment of the present invention. Referring to FIG. 1, an exhaust gas treatment device (100) according to the first embodiment of the present invention is a type of dry scrubber that comprises an apparatus for collecting powder (110) that collects powder in exhaust gas by using a filter and an adsorption reaction device (190) that treats exhaust gas that is discharged from the apparatus for collecting powder (110) by using an adsorption reaction.

The apparatus for collecting powder (110) filters exhaust gas through a filter and collects powder contained in the exhaust gas. The exhaust gas that is discharged from the apparatus for collecting powder (110) is fed to the adsorption reaction device (190).

Referring to FIG. 1 to FIG. 6, the apparatus for collecting powder (110) comprises a housing (120), a filter module (150) that is installed so as to be located inside the housing (120), and a filter striking module (160) that is installed in the housing (120).

The housing (120) is equipped with a filter installation unit (130) and an expansion unit (140) form to expand from the filter installation unit (130). The internal space of the housing (120) forms a powder storage space that stores collected powder.

The filter installation unit (130) is generally cylindrical, and provides a raised cylindrical filter installation space (131) inside of which the filter module (150) is disposed. The central axis (X) of the cylindrical filter installation space (131) extends in a vertical direction. The filter installation unit (130) is equipped with a base floor plate (132) and a base side wall (135) that extends upwards from the base floor plate (132). The base floor plate (132) is generally a flat circle that is disposed horizontally, and an upper surface of the base floor plate (132) forms a floor of the filter installation space (131). The filter module (150) is placed at the centre of the base floor plate (132) from the filter installation space (131). The base side wall (135) extends upward from an edge of the base floor plate (132) and forms a side wall of the filter installation space (131). An upper internal area of the base side wall (135) is open and forms an opening (137) through which the filter installation space (131) and outer portion communicate. An operator can access the filter installation space (131) from outside through the opening (137) to install or remove the filter module (150). In addition, the opening (137) can be appropriately sealed during the process wherein the adsorption reaction device (190) is coupled to the apparatus for collecting powder (110).

The expansion unit (140) is formed to expand so as to protrude sideways from a portion of a side of the filter installation unit (130). The expansion unit (140) forms an expansion space (141) that communicates with the filter installation space (131) on the interior. The expansion space (141) is formed to partially expand in a radial direction with respect to the central axis (X) from the cylindrical filter installation space (131). The expansion space (141) together with the filter installation space (131) forms the internal space of the housing (120). The expansion unit (140) is equipped with an expansion floor plate (142), an upper expansion plate (145) that is spaced apart from and above the expansion floor plate (142), and an expansion side wall (147) that connects the expansion floor plate (142) and upper expansion plate (145). The amount of powder collected is increased by the expansion space (141) formed by the expansion unit (140), so that the use time of the powder collecting device (110) may be extended.

The expansion floor plate (142) is disposed to be flat and is joined to the base floor plate (132) of the filter installation unit (130). It is preferable for the expansion floor plate (142) to be formed integrally with the base floor plate (132). The expansion floor plate (142) expands outward from a semicircular arc of the cylindrical base floor plate (132) to the exterior. An upper surface of the expansion floor plate (142) forms a floor of the expansion space (141). An upper surface of the base floor plate (132) and an upper surface of the expansion floor plate (142) are connected to be flat so as to form a floor of the entire internal space of the housing (120).

The upper expansion plate (145) is spaced apart from and above the expansion floor plate (142) and located to be opposite to each other, and is substantially the same shape as the expansion floor plate (142). The upper expansion plate (145) is flat and expands outwards from the base side wall (135). The upper expansion plate (145) forms a ceiling of the expansion space (141). The upper expansion plate (145) forms an installation port (146) for installation of the filter striking module (160).

The expansion side wall (147) is a vertical wall and forms a side wall of the expansion space (141). A lower end of the expansion side wall (147) is connected to an edge of the expansion floor plate (142), an upper end of the expansion side wall (147) connects to an edge of the upper expansion plate (145), and both ends of the expansion side wall (147) in a circumferential direction are connected to the base side wall (135). The expansion side wall (147) includes a first extension wall unit (148a) and a second extension wall unit (148b) that face each other, and a connecting wall unit (148c) that connects the two extension wall units (148a, 148b).

The first extension wall unit (148a) is formed to extend from the base side wall (135) and extends in a straight line along a circumferential direction of the expansion side wall (147). One end in a circumferential direction of the first extension wall unit (148a) constitutes and connects a tangential plane to the base side wall (135), and the other end in the circumferential direction connects to the connecting wall (148c). An inner wall of the first extension wall unit (148a) constitutes and is joined to a tangential plane to an inner wall of the expansion side wall (147).

The second extension wall unit (148b) faces the first extension wall unit (148a), which are disposed so as to be parallel to each other. The second extension wall unit (148b) extends from the base side wall (135) and extends straight along a circumferential direction of the expansion side wall (147). One end in the circumferential direction of the second extension wall unit (148b) constitutes and is joined to a tangential plane to the base side wall (135), and another end in the circumferential direction is connected to the connecting wall unit (148c). An inner wall of the second extension wall unit (148b) constitutes and is joined to a tangential plane to an inner wall of the expansion side wall (147).

The connection wall unit (148c) extends in the shape of a protruding curve from the filter installation unit (130) along a circumferential direction of the expansion side wall (147). Both ends in the circumferential direction of the connecting wall unit (148c) each constitutes and is joined to a tangential plane to the first extension wall unit (148a) and second extension wall unit (148b). The present embodiment describes a mode wherein the connection wall (148c) extends in a semicircular arc along a circumferential direction of the expansion side wall (147). The inner wall of the first extension wall unit (148a) and the inner wall of the second extension wall unit (148b) constitute a tangential wall to the inner wall of the connecting wall (148c).

Figure 5:
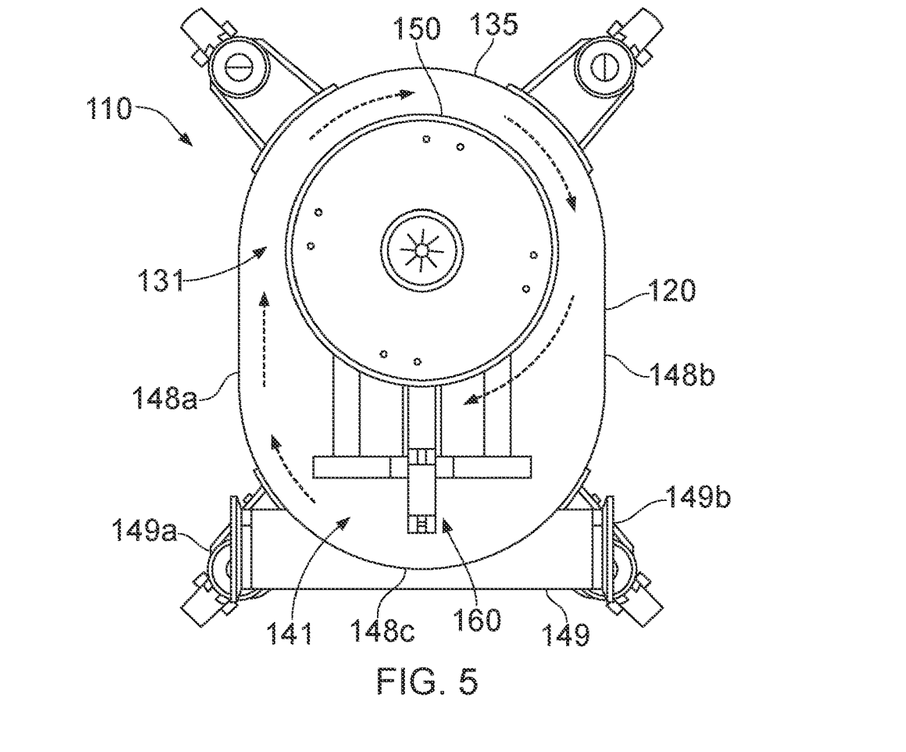
FIG. 5 shows the apparatus for collecting powder depicted in FIG. 1 having the housing cut along the A-A' line in FIG. 2 so as to reveal the interior.

A gas intake pipe (149) which communicates with the internal space of the housing (120), is coupled to the connecting wall unit (148c). The exhaust gas to be treated is introduced into the internal space of the housing (120) through the gas intake pipe (149). The gas intake pipe (149) extends in a horizontal direction in a straight line and is disposed so as to extend in a direction tangential to the connecting wall unit (148c). The gas intake pipe (149) is connected to the point that is furthest from the filter installation part (130) from the connecting wall unit (148c), and extends to both sides of the connecting wall unit (148c). Both ends of the gas intake pipe (149) are open, and first and second gas intake ports (149a, 149b) are formed at each end of the gas intake pipe (149). One out of the first gas intake port (149a) or second gas intake port (149b) that can reduce the length of the gas feed section is selected for use as the gas intake port. A pressure gauge, safety valve and the like may be installed in the remaining port to ensure safety of the process operation. FIG. 5 shows the flow of gas inside the housing (120) indicated by a broken arrow when the second gas intake port (149b) is selected as the gas intake port out of the two gas intake ports (149a, 149b). Referring to FIG. 5, the exhaust gas that flows into the internal space of the housing (120) through the second gas intake port (149b) flows uniformly to the vicinity of the filter module (150) along the base wall (135) and the first extension wall unit (148a) of the connecting wall unit (148c). As the exhaust gas flows from the internal space of the housing (120), the relatively heavy substances from the powder contained in the exhaust gas fall by their own weight and accumulate in the internal space of the housing (120).

Multiple wheels (129) are installed inside the housing (120) to facilitate the movement of the exhaust gas treatment equipment (100).

The filter module (150) is installed in the filter installation space (131) of the housing (120). The filter module (150) includes the filter body (151) that includes the filter and multiple support legs (158) that support the filter body (151).

The filter body (151) filters the exhaust gas introduced into the internal space of the housing (120) using the filter and feeds it to the adsorption reaction device (190). The filter body (151) is generally a standing cylinder and is disposed coaxially with the cylindrical filter installation space (131). The filter body (151) includes a lower plate member (152), upper place member (153), and filter member (154). The filter body (151) is located so as to be spaced apart from the floor of the filter installation space (131).

The lower plate member (152) is in the shape of a flat circular plate and is disposed horizontally.

The upper plate member (153) is in the shape of a flat circular plate and is spaced apart above the lower plate member (152) and disposed horizontally. At the centre of the upper plate member (153) is an outlet where filtered exhaust gas is discharged (153a). The outlet (153a) is located on a central axis (X). The filter body (151) and adsorption reaction device (190) communicate through the outlet (153a).

The filter member (154) is disposed between the lower plate member (152) and upper plate member (153) and filters the exhaust gas that is introduced therein. Although not depicted, multiple filter members (154) may be installed along a radial direction to achieve continuous filtering moving closer to the centre. Powder adhering to a surface of the filter member (154) may be dislodged by the filter striking module (160) and be removed.

Each of the multiple support legs (158) extends downward from the filter body (151) so as to separate the filter body (151) from the floor of the filter installation space (131).

Figure 6:
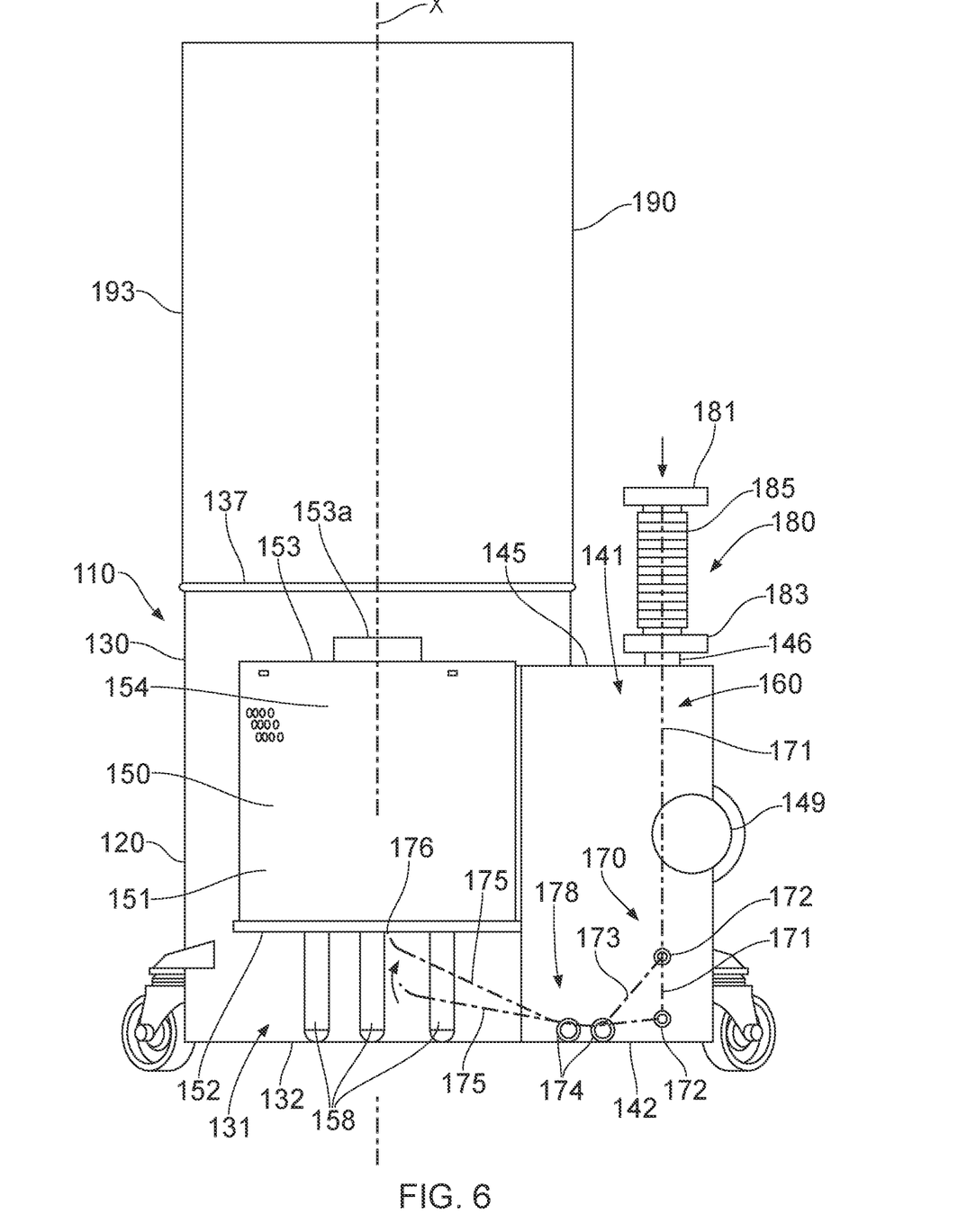
FIG. 6 shows the apparatus for collecting powder depicted in FIG. 1 having the housing cut along the B-B' line in FIG. 3 so as to reveal the interior.
Figure 7:
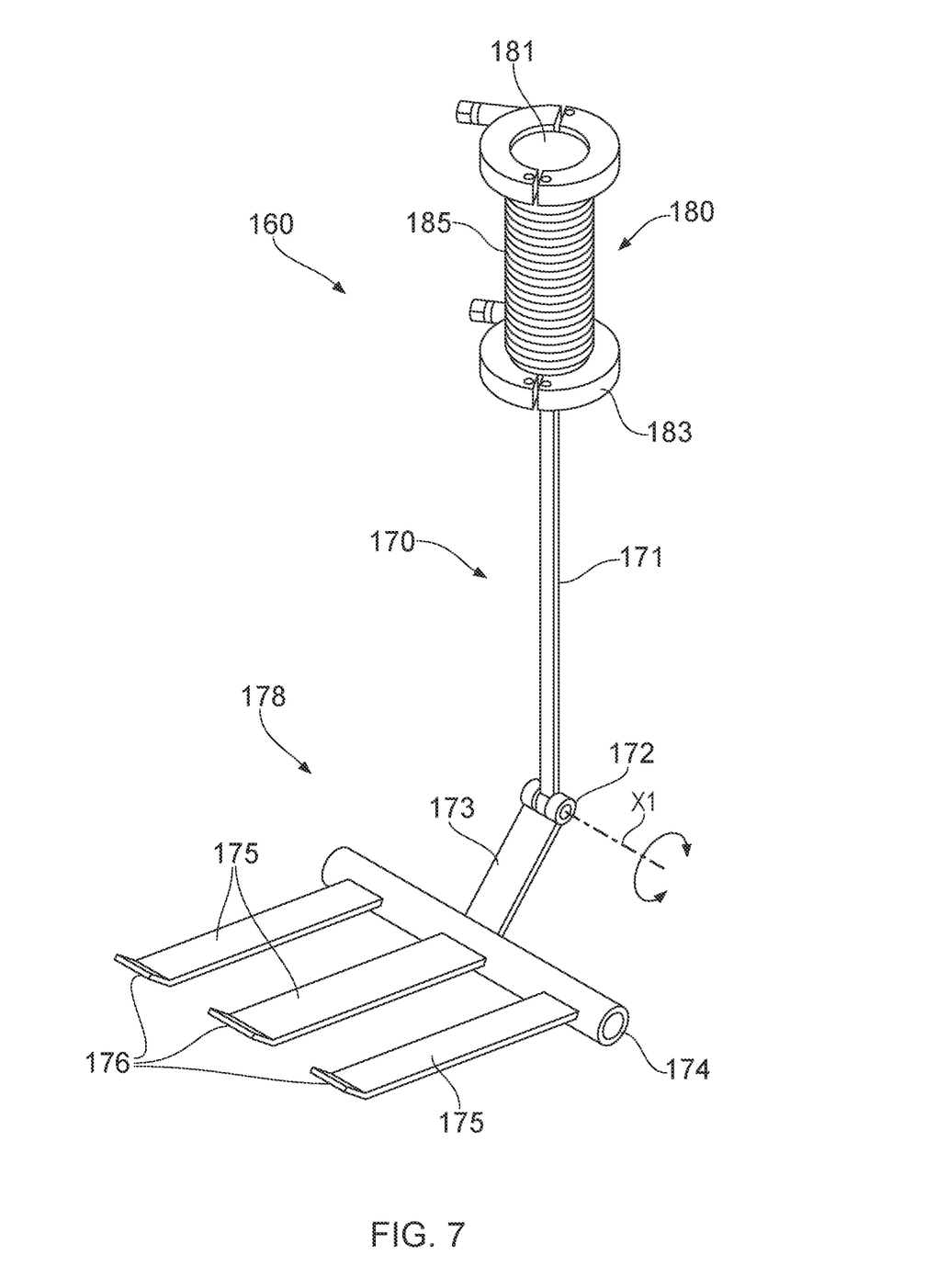
FIG. 7 shows a perspective view that depicts the filter striking module depicted in FIG. 6.

The filter striking module (160) applies physical impact to the filter body (151) to dislodge and remove powder adhering to the surface of the filter member (154) to perform the dust removal function for the filter. FIG. 7 shows a perspective view of the filter striking module (160). Referring to FIG. 1 to FIG. 7, the filter striking module (160) includes an operating unit (180) and a link structure (170) connected to the operating unit (180).

The operating unit (180) is installed on the outside of the housing (120) so as to be operated by an operator. Specifically, the operating unit (180) is installed on an installation port (146) that is formed on the upper expansion plate (145) of the housing (120). The operating unit (180) includes a pressure plate (181), port coupler (183), and a flexible tube (185) that is coupled between the pressure plate (181) and port coupler (183).

The pressure plate (181) is located so as to be spaced above the installation port (146). The flexible tube (185) and link structure (170) are connected to the pressure plate (181). An operator can operate the link structure (170) by pressing down and moving the pressure plate (181).

The port coupler (183) is spaced apart from and underneath the pressure plate (181) and is sealedly coupled to the installation port (146) that is formed on the upper expansion plate (145). The flexible tube (185) is coupled to the port coupler (183).

The flexible tube (185) extends vertically between the port coupler (183) and pressure plate that are located so as to be spaced apart vertically. An upper end of the flexible tube (185) is connected to the pressure plate (181) and a lower end of the flexible tube (185) is connected to the port coupler (183). The flexible tube (185) provides an elastic force in the direction in which the pressure plate (181) and the port coupler (183) become distant from each other. After moving downward from the initial position under the external force of the pressure plate (181), it moves upward and back to the initial position due to the elastic force of the flexible tube (185) when the external force is removed. Conventional bellows are used for the flexible tube (185) in the description of this embodiment. The internal space of the flexible tube (185) communicates with the internal space of the housing (120) through the installation port (146) formed on the upper expansion plate (145), and the internal space of the flexible tube (185) is sealed to the outside.

The link structure (170) includes a lever unit (178) and a connecting rod (171) that connects the lever unit (178) and the pressure plate (181).

The lever unit (178) is located in the internal space of the housing (120). The lever unit (178) includes a support (174), first extension rod (173) that extends from the support (174), and multiple second extension rods (175) that extend from the support (174). The support (174), first extension rod (173), and multiple second extension rods (175) are integrally formed.

The support (174) makes contact with the floor in the internal space of the housing (120) and is located between the filter body (151) and the installation port (146). The support (174) is in the shape of a circular pipe and is disposed to extend horizontally along the width direction of the filter body (151).

The first extension rod (173) is formed so as to extend from the support (174) toward the installation port (145). An end of the first extension rod (173) is rotatably coupled around the first rotational axis (X1) by the first hinge (172) to the connecting rod (171). The first rotational axis (X1) is a straight line extending parallel to the direction of extension of the support (174). When the pressure plate (181) of the operating unit (180) is at the original position thereof, the first extension rod (173) extends on an incline so as to rise up moving from the support (174) toward the installation port (146). This is for the purpose of securing a sufficient distance so that an end of the first extension rod (173) can move downward.

Multiple second extension rods (175) are formed so as to extend from the support (174) toward the filter body (151), which is on an opposite side of the first extension rod (173). The multiple second extension rods (175) are arranged side by side in sequence along the width direction of the filter body (151) while being spaced apart from each other. It is described that there are 3 second extension rods (175) in the present embodiment, but the present invention is not limited thereto. For example, there may be 1, 2, 4 or more second extension rods (175) and this is also within the scope of the present invention. Each end of the multiple second extension rods (175) is located underneath the filter body (151), and these multiple second extension rods (175) create an angle smaller than 180 degrees with the first extension rod (173). Each of the multiple second extension rods (175) is formed having a striking unit (176) that bends upward to extend at an end. The end of the striking unit (176) moves upward and strikes underneath of the filter body (151).

The adsorption reaction device (190) treats the exhaust gas that is discharged from the powder collection device (110) using an adsorption reaction. The adsorption reaction device (190) is coupled to an upper portion of the powder collecting device (110) so as to close an opening (137) formed in the housing (120) of the powder collecting device (110). Although not shown, an adsorption layer made of an adsorbent for adsorbing a gas component to be treated out of the exhaust gas is formed inside the adsorption reaction device (190), and the adsorption layer communicates with the outlet (153a) of the powder collecting device (110). The adsorption reaction device (190) may include multiple adsorption layers that are made of different types of absorbent to absorb and treat multiple gases. The adsorption reaction device (190) is generally cylindrical, and is disposed coaxially with the filter body (151) in a standing form. The side wall (193) of the adsorption reaction device (190) is formed along a vertical direction of the base wall (135) of the housing (130) so as to form a shape of a single cylinder.

Hereinafter, the operation of the filter striking module (160) will be described in detail with reference to FIG. 6. Referring to FIG. 6, when the operating unit (180) is not subject to external pressure from the operator, the striking unit (176) of the link structure (170) becomes located underneath and spaced apart from the filter body (151) as illustrated by a solid line. This is referred to as the normal state of the filter striking module (160) in the present embodiment. In this normal state, when an operator presses and moves down the pressure plate (181) of the operating unit (180), the connecting rod (171) that is coupled to the pressure plate (181) moves downward. As the connecting rod (171) moves downward, an end of the first extension rod (173) of the lever unit (178) that is coupled by the first hinge (171) to the end of the connection rod (171) accordingly moves downward, reducing the angle between the connecting rod (171) and first extension rod (173). As the end of the first extension rod (173) moves downward, the support (174) accordingly moves slightly toward the filter body (151) and an end of the second extension rod (175) moves upward toward a lower portion of the filter body (151). An end of the second extension rod (175) moves up and the striking unit (176) that is formed at the end of the second extension rod (175) strikes a lower portion of the filter body (151). This is referred to as the striking state of the filter striking module (160) in the present embodiment. Since the striking unit (176) is configured to strike a lower portion of the filter body (151), the connection between the adsorption reaction device (190) and filter body (151) that are connected vertically and coaxially can be stably maintained. Powder adhering to the surface of the filter member (154) falls due to the striking of the striking unit (176) and accumulates on the floor of the housing (120). When the external force applied to the operating unit (180) is removed, the pressure plate (181) returns to its original position due to the elastic force of the flexible tube (185) and the filter striking module (160) automatically returns to its normal state.

The above embodiment depicts a case where the filter striking module (160) is operated manually by the operator. However, a mechanical device such as a hydraulic piston can be added to the installation port (146) for enable automatic operation, and this is also within the scope of the present invention.

Figure 8:
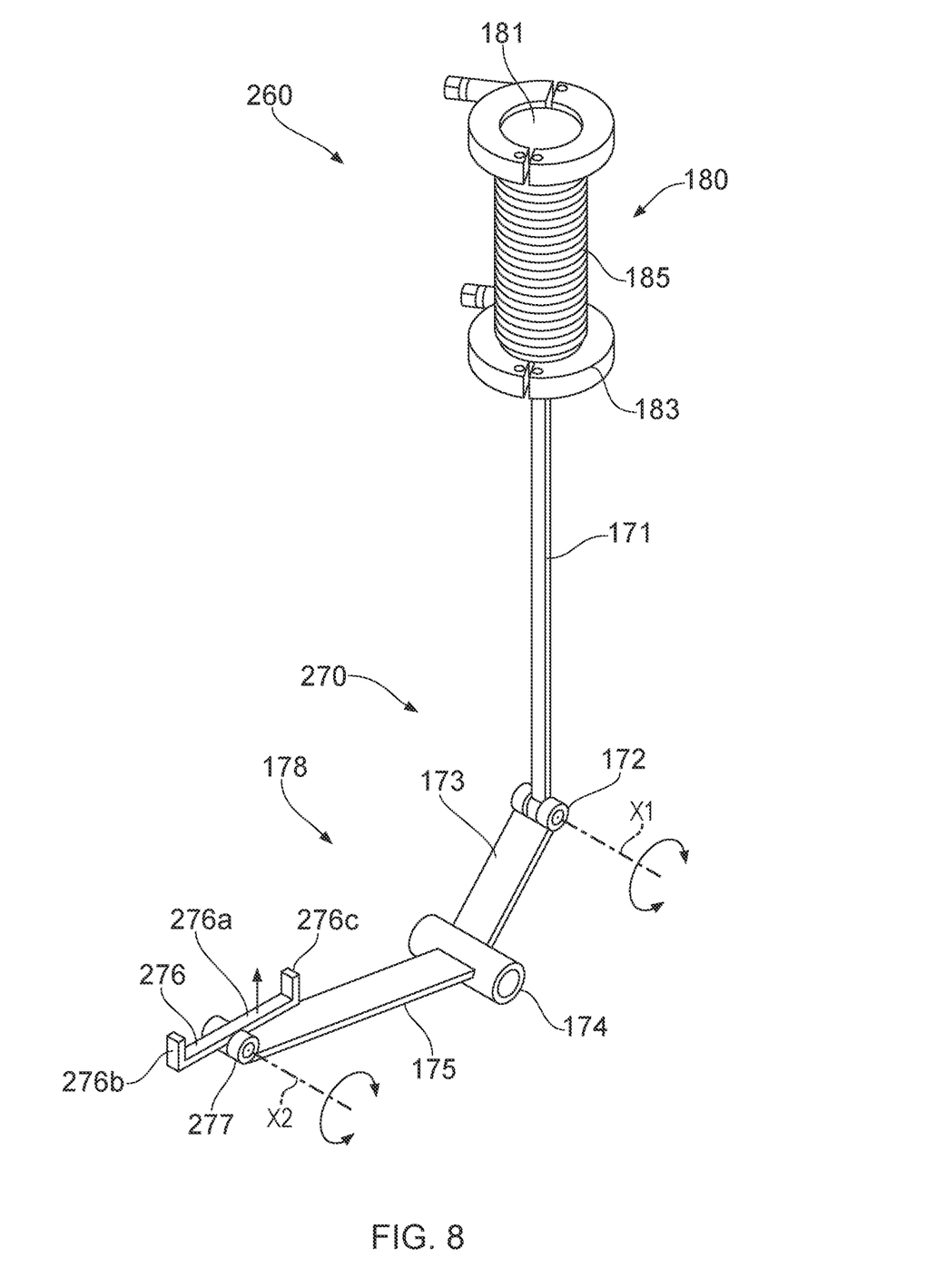
FIG. 8 shows a perspective view that depicts a different embodiment of the filter striking module depicted in FIG. 6.

FIG. 8 shows a perspective view depicting a filter striking module according to a different embodiment of the present invention. Referring to FIG. 8, the filter striking module (260) includes an operating unit (180) and a link structure (270) that is connected to the operating unit (180).

The operating unit (180) includes a pressure plate (181), a port coupler (183), a flexible tube (185) that is coupled between the pressure plate (181) and a port coupler (183). Since the configuration is the same as that of the operating unit (180) depicted in FIG. 7, a detailed description thereof will be omitted.

The link structure (270) includes a lever unit (278), a connecting rod (171) that connects the lever unit (278) and the pressure plate (181), and a striking member (276) that is coupled to the lever unit (278).

The lever unit (178) includes a support (174), a first extension rod (173) that extends from the support (174), and a second extension rod (175) that extends from the support (174). The lever unit (178) is of substantially the same configuration as the lever unit (178) depicted in FIG. 7, except that only one second extension unit (175) is provided in the lever unit (178), so a detailed description thereof is omitted. In the present embodiment, the second extension rod (175) is described as being one, but as shown in FIG. 7, there may be a plurality thereof, and this is also within the scope of the present invention.

The striking member (276) is rotatably coupled to the end of the second extension rod (175) by a second hinge 277 about the second rotation axis (X2). The second rotation axis (X2) is a straight line extending parallel to the extension direction of the support (174). The striking member (276) includes a striking rod (276a) extending in both directions along the radial direction of the second rotation axis (X2) having the second hinge (277) interposed therebetween and positioned above the second extension rod (175). Formed at both ends of the striking rod (276a) are a first striking part (276b) and a second striking part (276c) that protrude upward. As the end of the second extension rod (175) rises through the operation of the operating unit (180), either one of the first striking unit (276b) or second striking unit (276c) strikes the filter body (151 of FIG. 6), then the other one continuously strikes the filter body (151). In the embodiment shown in FIG. 8, it is preferable that there is a limit to the rotational range of the second hinge (277) so that the two striking units (276b and 276c) are always in an upward-facing state.

Since the connection rod 171 is substantially the same as the configuration of the connection rod (171) shown in FIG. 7, a detailed description thereof will be omitted.

Figure 9:
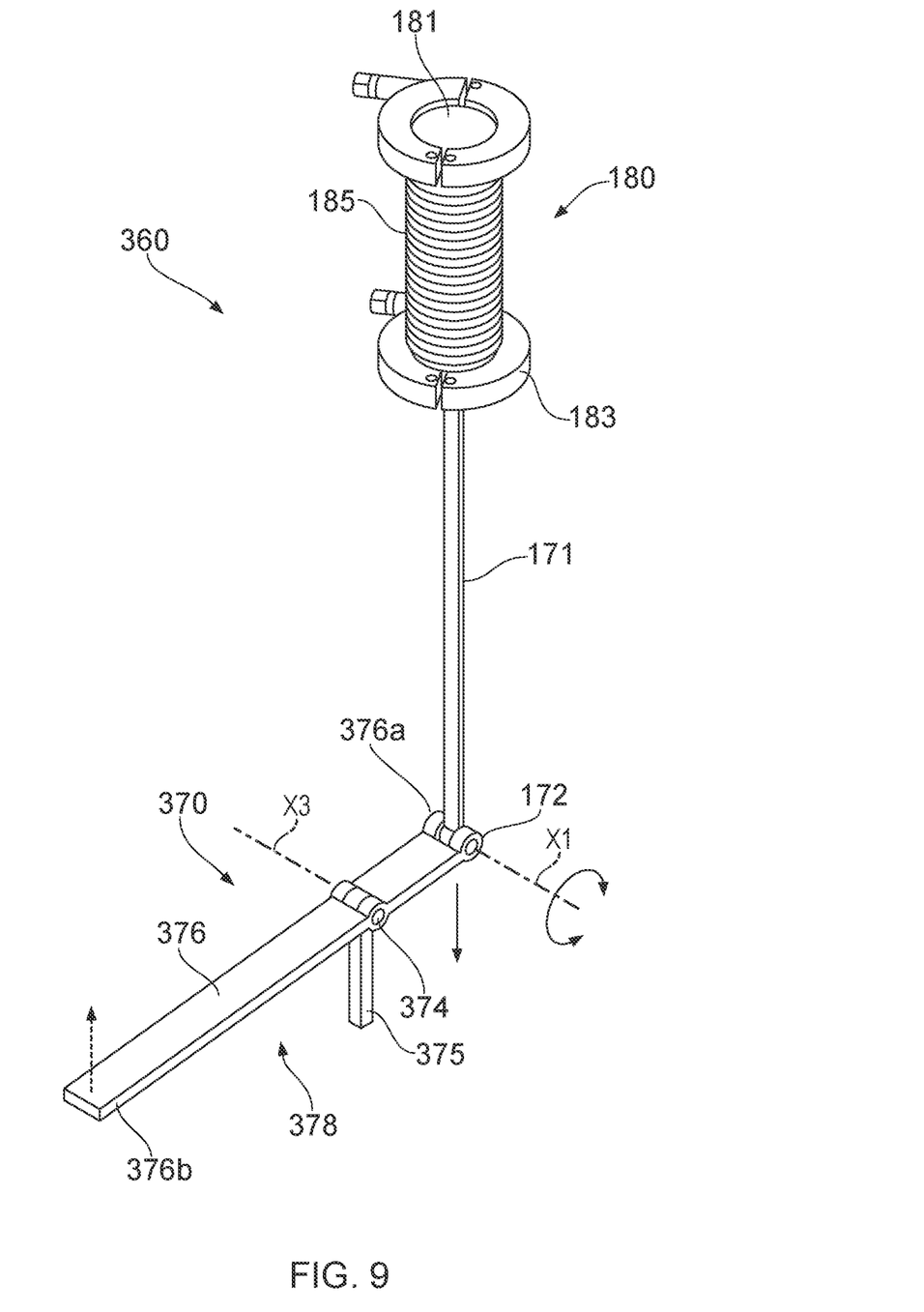
FIG. 9 is a perspective view that depicts another embodiment of the filter striking module depicted in FIG. 6.

FIG. 9 is a perspective view of a filter striking module according to another embodiment of the present invention.

Referring to FIG. 9, the filter striking module 360 includes an operating unit (180) and a link structure (370) connected to the operating unit (180).

The operating unit (180) includes a pressure plate (181), a port coupler (183), a flexible tube (185) that is coupled between the pressure plate (181) and a port coupler (183). Since the configuration is the same as that of the operating unit (180) depicted in FIG. 7, a detailed description thereof will be omitted.

The link structure (370) includes a lever unit (378) and a connecting rod (171) that connects the lever unit (178) and the pressure plate (181).

The lever unit (378) includes a support leg (375) and a lever (376) rotatably coupled to the support leg (375).

The support leg (375) is in the form of a rod that extends vertically, extending upward from the floor of the internal space of the housing (120) and positioned between the filter body (151) and the installation port (146). A lever (376) is rotatably coupled to an upper end of the support leg (375) about a third rotation axis (X3) by a third hinge (374). The third rotation axis (X3) is a straight line extending along the width direction of the filter body (151).

The lever (376) is in the form of a long extending rod and is rotatably coupled to the upper end of the support leg (375) by the third hinge (374) at a point between both ends of the lever (376) in the longitudinal direction. One end (376a) of the lever (376) is rotatably coupled to the connecting rod (171) through the first hinge (172), and the other end (376b) of the lever (376) is positioned underneath the filter body (151 of FIG. 6).

The other end (376b) of the lever (376) rises due to the operation of the operating unit (180) and strikes the filter body (151 of FIG. 6).

The connecting rod (171) has substantially the same structure as the connecting rod (171) depicted in FIG. 7, so a detailed description thereof will be omitted.

The striking member (276) of the embodiment depicted in FIG. 8 can also be used by being hingedly coupled to the end of the lever (376), which is also within the scope of the present invention.

Although the present invention has been described through the above embodiments, the present invention is not limited thereto. The above embodiments may be modified or changed without departing from the spirit and scope of the present invention, and those skilled in the art will recognize that such modifications and changes also belong to the present invention.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. An apparatus for collecting powder contained in exhaust gas before the exhaust gas is introduced into a cylindrical adsorption reaction device that treats the exhaust gas using an adsorption reaction, which comprises
a cylindrical filter body which includes a filter member that filters the exhaust gas and is disposed underneath the adsorption reaction device so as to be connected to the adsorption reaction device;
a housing that provides an internal space for housing the filter body; and
a filter striking module that applies a physical impact to the filter body to dislodge powder adhering to the filter member,
wherein the filter striking module includes an operating unit that is installed on the outside of the housing and a link structure that operates by means of the operating unit so as to strike the filter body in the internal space, and
the link structure includes a lever unit that is located in the internal space, and a connecting rod that connects the lever unit and the operating unit,
and the lever unit includes a support that makes contact with the floor of the internal space, a first extension rod extending from the support that is hingedly coupled to the connecting rod, and a second extension rod that extends from the support to the opposite side of the first extension rod,
and an end of the second extension rod is located underneath the filter body,
wherein an end of the first extension rod descends relative to the support by the operation of the operating unit while an end of the second extension rod ascends and strikes the filter unit from underneath.

2. The apparatus for collecting dust of claim 1 wherein multiple second extension rods are arranged in a line.

3. The apparatus for collecting dust of claim 1 wherein the link structure further includes a striking member which is hingedly coupled to an end of the second extension rod, and multiple striking units are formed mutually spaced apart on the striking member, and are disposed in a radial direction of the axis of rotation through the hinge.

4. An apparatus for collecting powder contained in exhaust gas before the exhaust gas is introduced into a cylindrical adsorption reaction device that treats the exhaust gas using an adsorption reaction, which apparatus comprises
a cylindrical filter body which includes a filter member that filters the exhaust gas and is disposed underneath the adsorption reaction device so as to be connected to the adsorption reaction device;
a housing that provides an internal space for housing the filter body; and
a filter striking module that applies a physical impact to the filter body to dislodge powder adhering to the filter member,
wherein the filter striking module includes an operating unit that is installed on the outside of the housing and a link structure that operates by means of the operating unit so as to strike the filter body in the internal space, and
the link structure includes a lever unit that is located in the internal space, and a connecting rod that connects the lever unit and the operating unit,
wherein the lever unit includes a support leg and a lever that is rotatably coupled to the support leg, and
one end portion of the lever is hingedly coupled to the connecting rod and the other end of the lever is located underneath the filter unit, and
one end of the lever descends and the other end of the aforementioned lever ascends by the operation of the operating unit so as to strike the filter body from underneath.

5. The apparatus for collecting powder in exhaust gas of claim 1,
wherein the connecting rod is disposed so as to extend vertically, and a lower portion of the connecting rod is hingedly coupled to an end of the first extension rod, and the connecting rod moves along a vertical direction by the operating unit.

6. An apparatus for collecting powder contained in exhaust gas before the exhaust gas is introduced into a cylindrical adsorption reaction device that treats the exhaust gas using an adsorption reaction, which comprises a cylindrical filter body which includes a filter member that filters the exhaust gas and is disposed underneath the adsorption reaction device so as to be connected to the adsorption reaction device;

a housing that provides an internal space for housing the filter body; and a filter striking module that applies a physical impact to the filter body to dislodge powder adhering to the filter member, wherein the filter striking module includes an operating unit that is installed on the outside of the housing and a link structure that operates by means of the operating unit so as to strike the filter body in the internal space, and the operating unit is installed in a port formed in the housing, and the operating unit includes a port coupler that is coupled to the port, a pressure plate that is spaced apart from the port coupler and is connected to the link structure, and an elastic tube that connects the port coupler to the aforementioned pressure plate, and the pressure plate can move so that the distance to the port coupler varies, and the elastic tube provides elasticity in the direction in which the pressure plate and the port coupler move apart from each other.

7. An exhaust gas treatment equipment further comprising:

a cylindrical adsorption reaction device that treats exhaust gas using an adsorption reaction; and an apparatus for collecting powder in exhaust gas which collects powder contained in the exhaust gas before the exhaust gas is introduced into the adsorption reaction device, wherein the apparatus for collecting powder in exhaust gas is the apparatus for collecting powder in exhaust gas as recited in claim 1.

\* \* \* \* \*